(12) United States Patent
Westerinen et al.

(10) Patent No.: US 7,065,740 B2
(45) Date of Patent: Jun. 20, 2006

(54) SYSTEM AND METHOD TO AUTOMATE THE MANAGEMENT OF COMPUTER SERVICES AND PROGRAMMABLE DEVICES

(75) Inventors: W. Jeff Westerinen, Sammamish, WA (US); James R. Benton, Seattle, WA (US); Mukesh Karki, Issaquah, WA (US); Alan R. Morin, Kirkland, WA (US); Raymond D. Pedrizetti, Sammamish, WA (US); Thomas C. Phillips, Bellevue, WA (US); Kartik N. Raghavan, Seattle, WA (US); Paul Sutton, Seattle, WA (US); Curt Steeb, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 735 days.

(21) Appl. No.: 10/128,062

(22) Filed: Apr. 23, 2002

(65) Prior Publication Data

US 2003/0041131 A1 Feb. 27, 2003

Related U.S. Application Data

(60) Provisional application No. 60/314,785, filed on Aug. 24, 2001.

(51) Int. Cl.
*G06F 9/44* (2006.01)
(52) U.S. Cl. ............... 717/101; 717/102; 717/107
(58) Field of Classification Search ........ 717/101–108, 717/120–122; 707/203–204
See application file for complete search history.

(56) References Cited

U.S. PATENT DOCUMENTS

| | | | | |
|---|---|---|---|---|
| 5,155,837 A * | 10/1992 | Liu et al. | ..................... | 709/221 |
| 5,233,513 A * | 8/1993 | Doyle | ........................... | 705/7 |
| 5,269,014 A * | 12/1993 | Ogino | ......................... | 703/22 |
| 5,379,423 A * | 1/1995 | Mutoh et al. | ................ | 707/204 |
| 5,671,351 A * | 9/1997 | Wild et al. | ..................... | 714/38 |
| 6,067,548 A * | 5/2000 | Cheng | .................... | 707/103 R |
| 6,106,569 A * | 8/2000 | Bohrer et al. | ............... | 717/100 |
| 6,167,563 A * | 12/2000 | Fontana et al. | ............. | 717/107 |
| 6,167,564 A * | 12/2000 | Fontana et al. | ............. | 717/104 |
| 6,275,976 B1 * | 8/2001 | Scandura | .................... | 717/120 |
| 6,643,555 B1 * | 11/2003 | Eller et al. | .................... | 700/83 |
| 6,964,034 B1 * | 11/2005 | Snow | ......................... | 717/121 |
| 6,990,513 B1 * | 1/2006 | Belfiore et al. | ............ | 709/203 |

OTHER PUBLICATIONS

Penharkar et al, "A Probabilistic model for predicting software development effort", IEEE Trans. on Software Engineering, vol. 31, No. 7, pp. 615-624, 2005.*

(Continued)

*Primary Examiner*—Anil Khatri
(74) *Attorney, Agent, or Firm*—Microsoft Corporation

(57) ABSTRACT

An apparatus and method to automate the deployment, provisioning, and management of a programmable device for the life cycle states of the programmable device is presented. The system includes an automation interface for a developer to develop modules to aid in the automation of the deployment, provisioning, and management of the programmable device and for a user to direct the system to enter into a state of the life cycle. A controller moves the programmable device into states of the life cycle in response to triggering events occurring.

50 Claims, 9 Drawing Sheets

OTHER PUBLICATIONS

Berner et al, "Observations and lesson learned from automated testing", ACM ICSE, pp. 571-579, 2005.*

Sawyer, "Software development teams", Comm. of the ACM, pp. 95-99, vol. 47, No. 12, 2004.*

Agarwal et al, "A knowledge nased manager for software projects", ACM 281-286, 1988.*

J.A. Farrell & H. Kreger, *Web Services Management Approaches*, IBM Systems Journal, vol. 41, No. 2, 212-227 (2002).

* cited by examiner

SYSTEM AND METHOD TO AUTOMATE THE MANAGEMENT OF COMPUTER SERVICES AND PROGRAMMABLE DEVICES

CROSS-REFERENCE TO RELATED PATENT APPLICATIONS

This patent application claims the benefit of U.S. provisional patent application No. 60/314,785, filed Aug. 24, 2001.

FIELD OF THE INVENTION

This invention relates generally to managing programmable devices and computer services and, more particularly, relates to a method and system for dynamically managing programmable devices or computer services for the life cycle of the programmable devices or computer service.

BACKGROUND OF THE INVENTION

Programmable devices such as computing devices, "smart" appliances and the like are typically capable of serving one or more purposes defined by the operating system used by the programmable devices and one or more application programs that are installed on the programmable devices. To deploy and provision a programmable device, a user typically has to sequentially and manually install an operating system, install one or more application programs, and configure the operating system and application program to work with each other. This process can be very time consuming depending on the complexity of the operating system and application program in question, and more typically requires complex scripts and custom development. It is not uncommon in a corporate or commercial setting that this process has to be repeated for hundreds or thousands of programmable devices.

The time consuming nature of provisioning programmable devices is also troublesome when a particular device fails or experiences an error. For example, if a programmable device has to be replaced, a service provider has to manually install an operating system, an application program and configure a new programmable device to replace the one that failed. This process may take hours to complete, and in the meantime a customer may experience problems such as losing sales, etc.

Industry has recognized the above problems and are developing vastly different techniques for bringing programmable devices on-line. For example, techniques have been developed for automating the provisioning of a programmable device. Techniques have also been developed for automating portions of the deployment of the programmable device. These proprietary techniques result in a high level of expertise that is needed on site to deploy and provision the programmable device, which mandates experienced, expensive, and hard to find personnel.

Additionally, computer services to handle specific tasks have been formed to help consumers. For example, services are provided that provision programmable devices. These computer services make it easier for the end consumer. However, the services do not reduce the labor involved in deploying and provisioning programmable devices in large numbers. Some services result in an increase in the labor involved in deploying and provisioning and maintaining programmable devices in large numbers. Additionally, these services provide no mechanism for third parties to add value-added tools into the deployment and provisioning process.

A related problem is that once a programmable device is deployed and provisioned, the user/owner is unlikely to reprovision the programmable device due to the high costs. Moreover, many of the techniques are closely tied to the underlying hardware. As the hardware evolves, original equipment manufacturers ("OEMs") provide utilities to configure the hardware. These utilities are often not compatible with the proprietary techniques and result in increased labor to administer the hardware. As a result, these proprietary techniques often lead to an increase in the amount of labor and the skill level required to support the programmable devices and the underlying hardware.

BRIEF SUMMARY OF THE INVENTION

The present invention provides a method and apparatus to automate the deployment, provisioning, and management of a function for the life cycle of the programmable device. This results in reducing the amount of labor and the level of skill required to support the function. As used herein, a function means a computer service, a programmable device, or a combination of computer services and programmable devices. More specifically, in accordance with the present invention, a number of states are defined for the lifecycle of the function and the transition of moving the function from one state to another state is initiated in response to a triggering event. The defined states for a programmable device portion of a function comprise an untested state, a tested state, an undeployed state, a deployed state, a prepped state, a provisioned state, an in-service state, a trouble state, and a retirement state. The defined states for a computer service portion of a lifecycle comprise an untested state, a tested state, a planned state, a provisioned state, an on-line state, a trouble state, and a retirement state. Each function is in either one of the states or is in the process of transitioning from one state to another state.

A plurality of sets of procedures to follow is defined to transition the function between the defined states. In one embodiment, the sets of procedures include a testing/development procedure, a planning procedure, a deployment procedure, a prepping procedure, and a provisioning procedure More specifically, in the testing/development procedure, performance and reliability tests are run on a planned installation and an image is created of the system. An image repository is used to store images. In the planning procedure, a need is anticipated and quantified for bringing on additional capacity and resource planning is performed to meet the need. In the deployment procedure, the components of the function to be installed at an installation location are received at its installation location and installed. Once installed, the prepping and provisioning procedures are run where the function is configured and provisioned. If necessary, storage and network resources are also provisioned.

The present invention provides a flexible extensible infrastructure to provide software developers and end users the ability to develop products that can be plugged into the infrastructure to drive the automation or to plug in modules for specific types of functions. In one embodiment, this is accomplished by providing an upper level interface and a lower level of interfaces. The upper level interface provides the developer and end user a way to create solutions that utilize or drive the lifecycle through a set of applications or scripts (i.e., products) that plug into the infrastructure. The lower level interfaces accommodate several types of providers, including providers for deploying specific hardware (e.g., web appliances, network-attached-storage ("NAS") appliances, etc.) and/or software, for networking hardware and software such as load balancers, and for storage area network devices.

Additional features and advantages of the invention will be made apparent from the following detailed description of illustrative embodiments which proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE INVENTION

Figure 1:
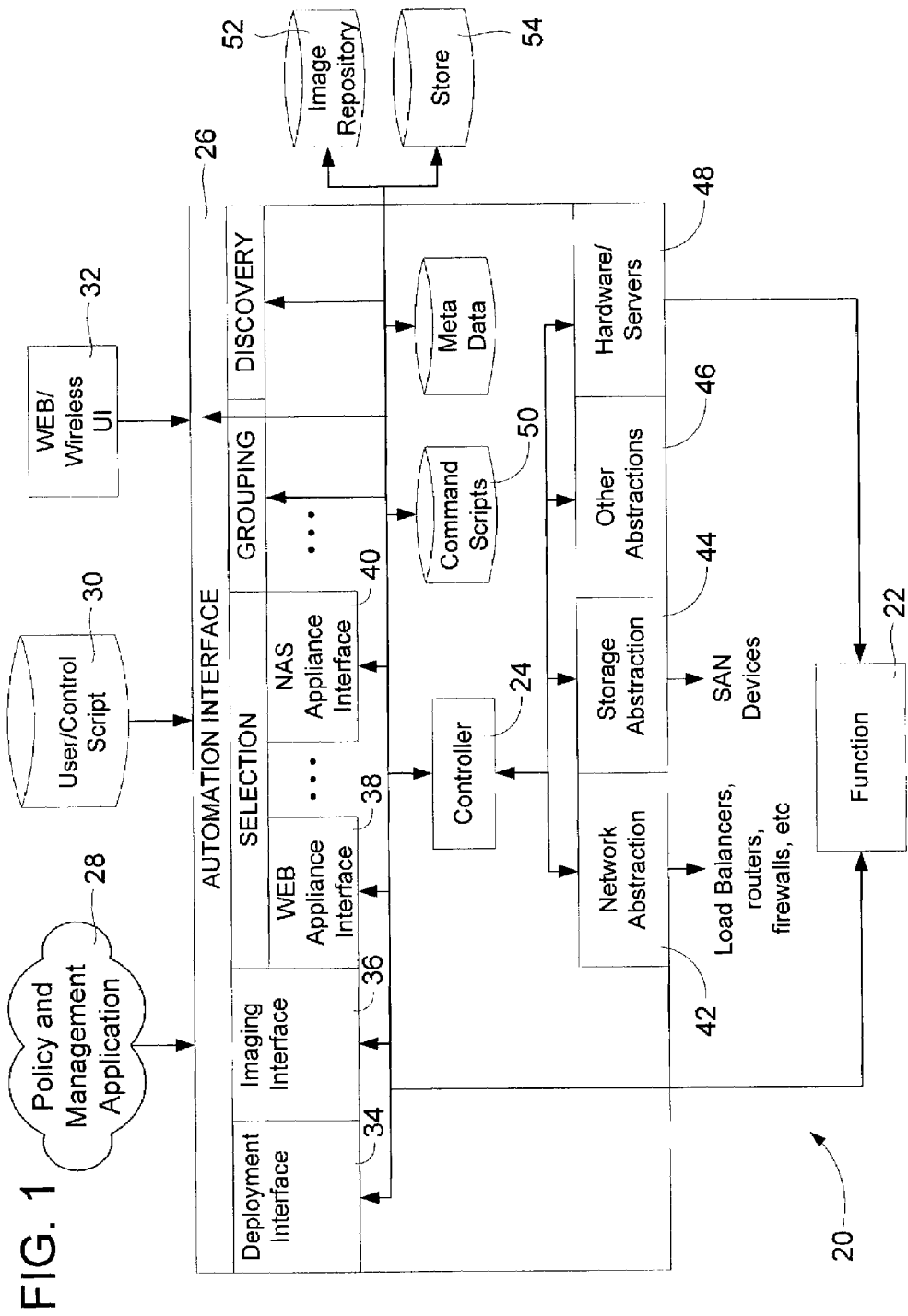
FIG. 1 is a block diagram generally illustrating an exemplary system in which the present invention operates.

Turning to the drawings, wherein like reference numerals refer to like elements, the invention is illustrated as being implemented in a suitable environment. Although not required, the invention will be described in the general context of computer-executable instructions, such as program modules, being executed by a programmable device. Generally, program modules include routines, programs, objects, components, data structures, etc. that perform particular tasks or implement particular abstract data types. Moreover, those skilled in the art will appreciate that the invention may be practiced with many types of programmable devices, including hand-held devices, multi-processor systems, network PCs, minicomputers, mainframe computers, microprocessor based or programmable consumer electronics including web based appliances, and the like. The invention may also be practiced in distributed computing environments where tasks are performed by remote processing devices that are linked through a communications network. In a distributed computing environment, program modules may be located in both local and remote memory storage devices.

FIG. 1 illustrates an example of the overall architecture in which the present invention operates. The lifecycle management system 20 automates the deployment, provisioning, and operational management of the function 22. As previously indicated, the function may be a computer service, a programmable device, or a combination of computer services and programmable devices. By way of example and not limitation, the function may be a web service, a print service, one or more servers, one or more storage devices, one or more routers, a data center, and the like. In the description that follows, the function 22 shall be referred to as a programmable device 22 in those instances when a procedure is being performed on the programmable device portion of the function. For example, if the function is a web service, content and applications are added to the programmable devices (e.g., servers) that are used to implement the web service. A controller 24 has a software engine that moves the function 22 from one lifecycle state to another. The lifecycle management system 20 has an automation interface 26 that enables OEMs, service providers, and other developers to develop modules that are used to trigger the controller 24 to transition the function 22 from one lifecycle state to another. The modules may include, by way of example, policy and management applications 28, controller scripts 30, and web and wireless user interfaces 32. The policy and management applications 28 adds policy rules and templates that address customer problems and issues. The controller scripts 30 are used to enable clients to move a programmable device 22 from one lifecycle state to another. The web/wireless interfaces 32 implement functionality for various personnel. For example, there may be multiple interfaces for various personnel classes, each interface presenting only the functionality desired for a particular personnel class.

A set of interfaces provide OEMs, service providers, and other developers the ability to plug in modules which are specific to particular types of programmable devices or hardware supporting the function. The set of interfaces includes a deployment interface 34, an imaging interface 36, a web appliance interface 38, and a NAS (network attached storage) appliance interface 40. While not shown, it is recognized that many other types of interfaces can be used. The deployment interface 34 provides the OEMs, service providers, and other developers the capability to deploy specific hardware and BIOS types (e.g., BIOS configuration and network operating system installation on an unformatted programmable device). The imaging interface 36 is used to communicate with an imaging manager (not shown) to add to an image repository 52 or modify images in the image repository 52. The web appliance interface 38 and NAS appliance interface 40 are used to communicate with web appliances and NAS appliances.

A series of providers and/or abstractions provide the system 20 the ability to communicate with hardware involved in the deployment of the function 22. The abstractions include network abstraction 42, storage abstraction 44, and other abstractions 46. Network abstraction 42 provides an abstraction of hardware load balancers, routers, firewalls, etc. Storage abstraction 44 provides an abstraction of hardware used in storage area networks such as switches and other routing devices, host bust adapters, and devices such as storage enclosures and tape libraries attached to the storage area network and the The controller 24 uses command script modules 50 and other program modules to transition the function 22 between states of the lifecycle. Images that are used to install operating systems and/or programs on the programmable device are stored in image repository 52. The store 54 stores identification and location information for the function 22.

Figure 2:
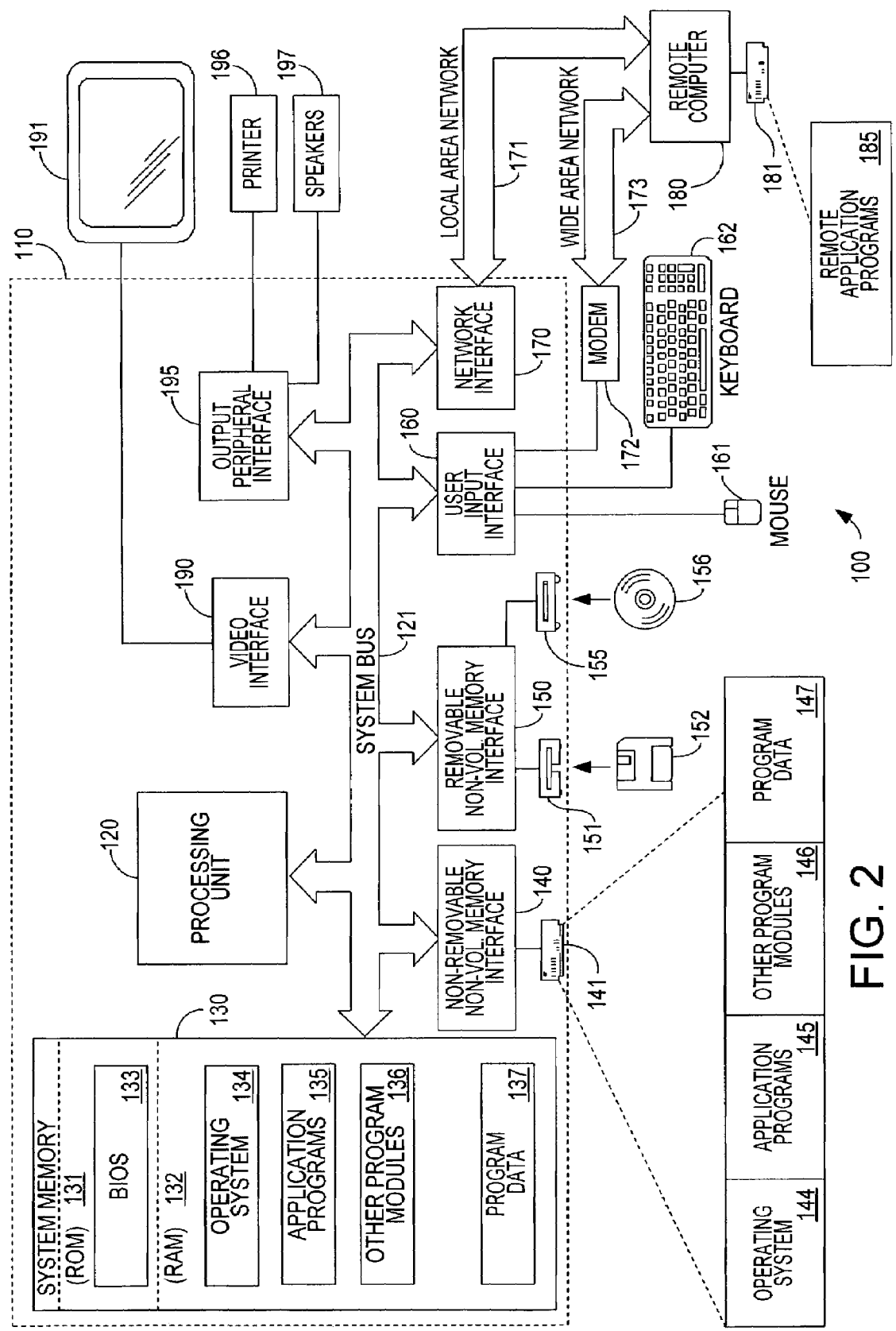
FIG. 2 is a block diagram generally illustrating an exemplary programmable device on which the present invention operates.

FIG. 2 illustrates an example of a suitable programmable device 100 on which the invention may be implemented. The programmable device 100 is only one example of a suitable computing environment and is not intended to suggest any limitation as to the scope of use or functionality of the invention.

The invention is operational with numerous other general purpose or special purpose programmable devices. Examples of well known programmable devices that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a processor. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 2, an exemplary programmable device includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Associate (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 2 illustrates operating system 134, application programs 135, other program modules 136, and program data 137.

The computer 110 may also include other removable/non-removable, volatile/nonvolatile computer storage media. By way of example only, FIG. 2 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 2, provide storage of computer readable instructions, data structures, program modules and other data for the computer 110. In FIG. 2, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers hereto illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through a output peripheral interface 195.

The computer 110 may operate in a networked environment using logical connections to one or more remote computers, such as a remote computer 180. The remote computer 180 may be another personal computer, a server, a router, a network PC, a peer device or other common network node, and typically includes many or all of the elements described above relative to the personal computer 110, although only a memory storage device 181 has been illustrated in FIG. 2. The logical connections depicted in FIG. 2 include a local area network (LAN) 171 and a wide area network (WAN) 173, but may also include other networks. Such networking environments are commonplace in offices, enterprise-wide computer networks, intranets and the Internet.

When used in a LAN networking environment, the personal computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the personal computer 110, or portions thereof, may be stored in the remote memory storage device. By way of example, and not limitation, FIG. 2 illustrates remote application programs 185 as residing on memory device 181. It will be appreciated that the network connections shown are exemplary and other means of establishing a communications link between the computers may be used.

In the description that follows, the invention will be described with reference to acts and symbolic representations of operations that are performed by one or more computer, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operation described hereinafter may also be implemented in hardware. The life cycle of a server or server appliance in a data center shall be used to describe the invention. The invention is not meant to be limited to a server or server appliance as those of skill in the art will appreciate that the present invention may be used to plan, deploy, provision, and manage many other types of programmable devices over its life cycle.

Figure 3A:
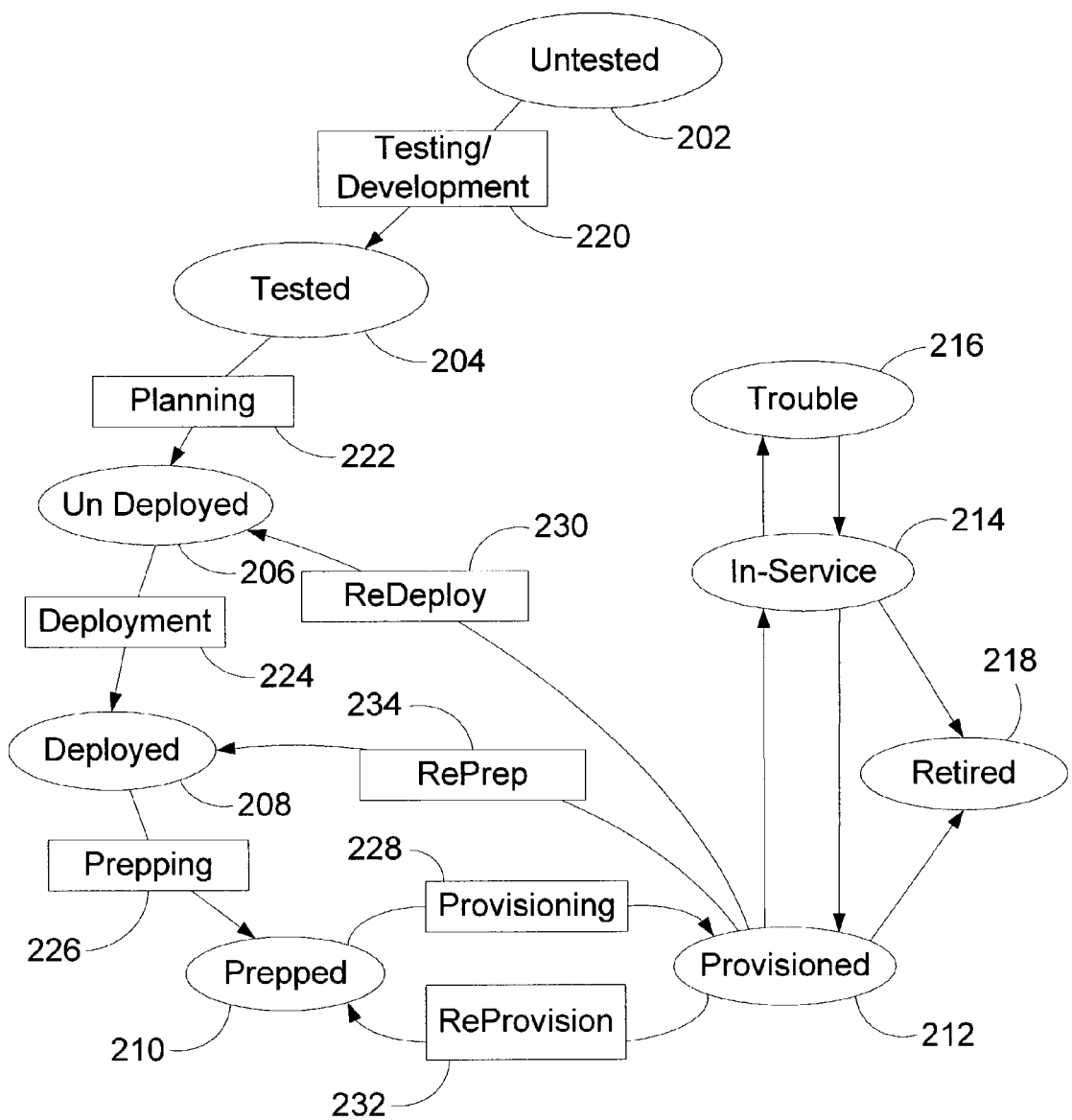
FIG. 3a is a block diagram illustrating the states of a programmable device lifecycle in an embodiment of the present invention.
Figure 3B:
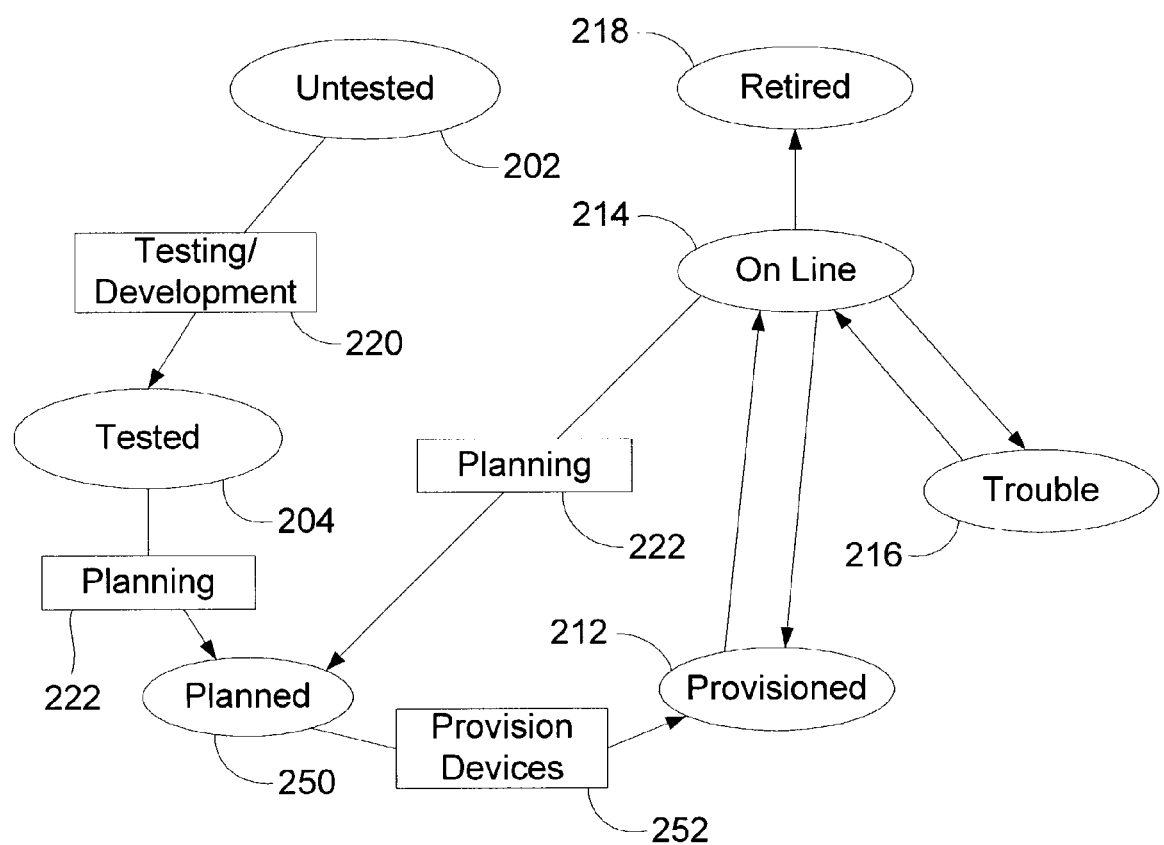
FIG. 3b is a block diagram illustrating the states of a computer service lifecycle in an embodiment of the present invention.
Figure 4:
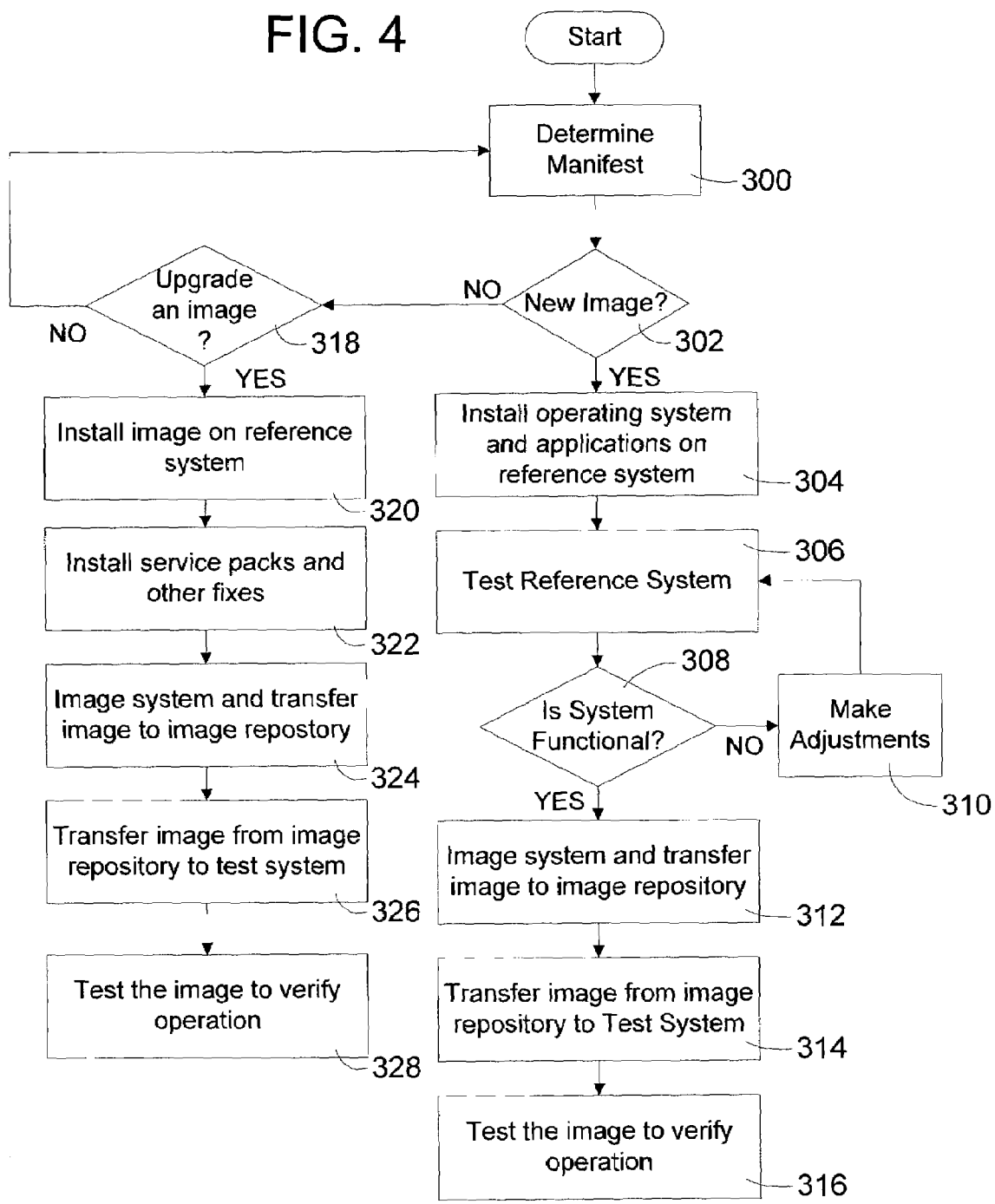
FIG. 4 illustrates a flow chart of a method of developing and testing images in accordance with the present invention.

Turning now to FIGS. 3a and 3b, the states of a typical lifecycle 200 are shown for one embodiment. FIG. 3a illustrates the states for a programmable device and FIG. 3b illustrates the states for a computer service for the embodiment. Those skilled in the art recognize that there can be any number of states in a lifecycle of a function. The typical states of a programmable device in the embodiment shown in FIG. 3a are the untested state 202, the tested state 204, the undeployed state 206, the deployed state 208, the prepped state 210, the provisioned state 212, the in-service state 214, the trouble state 216, and the retirement state 218. The typical states of a computer service shown in FIG. 3b are the untested state 202, the tested state 204, the planned state 250, the provisioned state 212, the on-line state 214, the trouble state 216, and the retired state 218. The on-line state is equivalent to the in-service state.

In the description that follows, the transitions and triggering events for a programmable device portion of a function will be described and references to a computer service portion of a function will be discussed in those instances where the states are the same or are similar. The states, triggering events, and transitions of a service that are different from a programmable device will be discussed separately.

The controller 24 initiates a transition to transition the function 22 from one state to another state in response to receiving a triggering event. A triggering event may be received by the controller 24 through a variety of methods. For example, a triggering event may be manually entered by a user, automated, an output from an Simple Network Management Protocol (SNMP) or Windows Management Instrumentation (WMI) management application, a system event, operational logic responding to multiple inputs, policy code responding to a variety of inputs and implementing predefined policy, and the like. The controller 24 uses a set of procedures to transition the function 22 from one state to another state. Each transition between states has its own set of procedures that is automated.

Turning now to FIGS. 4 to 8, the triggering events and the sets of procedures to transition the function 22 from one lifecycle state to another lifecycle state in one embodiment will now be described. The triggering event to transition from the untested state 202 to tested state 204 occurs when a new function 22 is being developed and tested, With reference to FIG. 4, the initial step performed in the testing/development procedure 220 used to transition the function to the tested state is to make a determination of the tasks to be performed during the transition (step 300). For a function that has a computer service, the tasks to be performed include building any programmable devices required to carry out the service and performance testing the programmable devices. For a function that has a programmable device, the tasks to be performed include upgrading an image or creating a new image and testing the upgraded or new image. An image as used herein is a duplicate, copy, or representation of a program, operating system, data, or combination of programs, operating systems and data.

If a new image is to be created (step 302), an operating system and applications, if any, are installed on a reference system (step 304). The reference system is a programmable device that is the same type of device as the programmable device 22. The installed system is tested on the reference system (step 306) and a determination is made if the system is functioning properly (step 308). If the system is not functioning properly, adjustments are made (step 310) until the system is functioning properly. If the system is functioning properly, the system is imaged using tools known in the art and the image is transferred to the image repository 52 (step 312). The image is then copied from the image repository 52 to a test system (step 314) and tested to verify that the image in the image repository 52 functions properly in terms of comparability, reliability, performance, etc. (step 316). Once the image is verified, a tag is created in the image repository 52 to indicate that the image is qualified and can be deployed on the programmable device 22. Alternatively, the store 54 is updated to indicate that the image is qualified.

If an existing image is being upgraded (step 318), the existing image is copied from the image repository 52 and installed on the reference system (step 320). Updates (e.g., service packs and other fixes) are applied to the existing image and the updated image is copied back into the image repository 52 (step 322). The upgraded image is copied from the image repository 52 onto the test system (step 326) and tested (step 328).

Once the new image or upgraded image has been tested to verify operation, the new or upgraded image is installed on the programmable device 22. If there are a plurality of programmable devices (e.g., servers in a data center), the new or upgraded image is copied onto selected programmable devices or all of the programmable devices. Alternatively, a command script is used to update the programmable devices by scripting the changes and running the changes directly on the programmable devices. Once the above set of procedures 220 is completed, the transition between the untested state and tested state is completed and the function 22 enters into the tested state 204.

Figure 5:
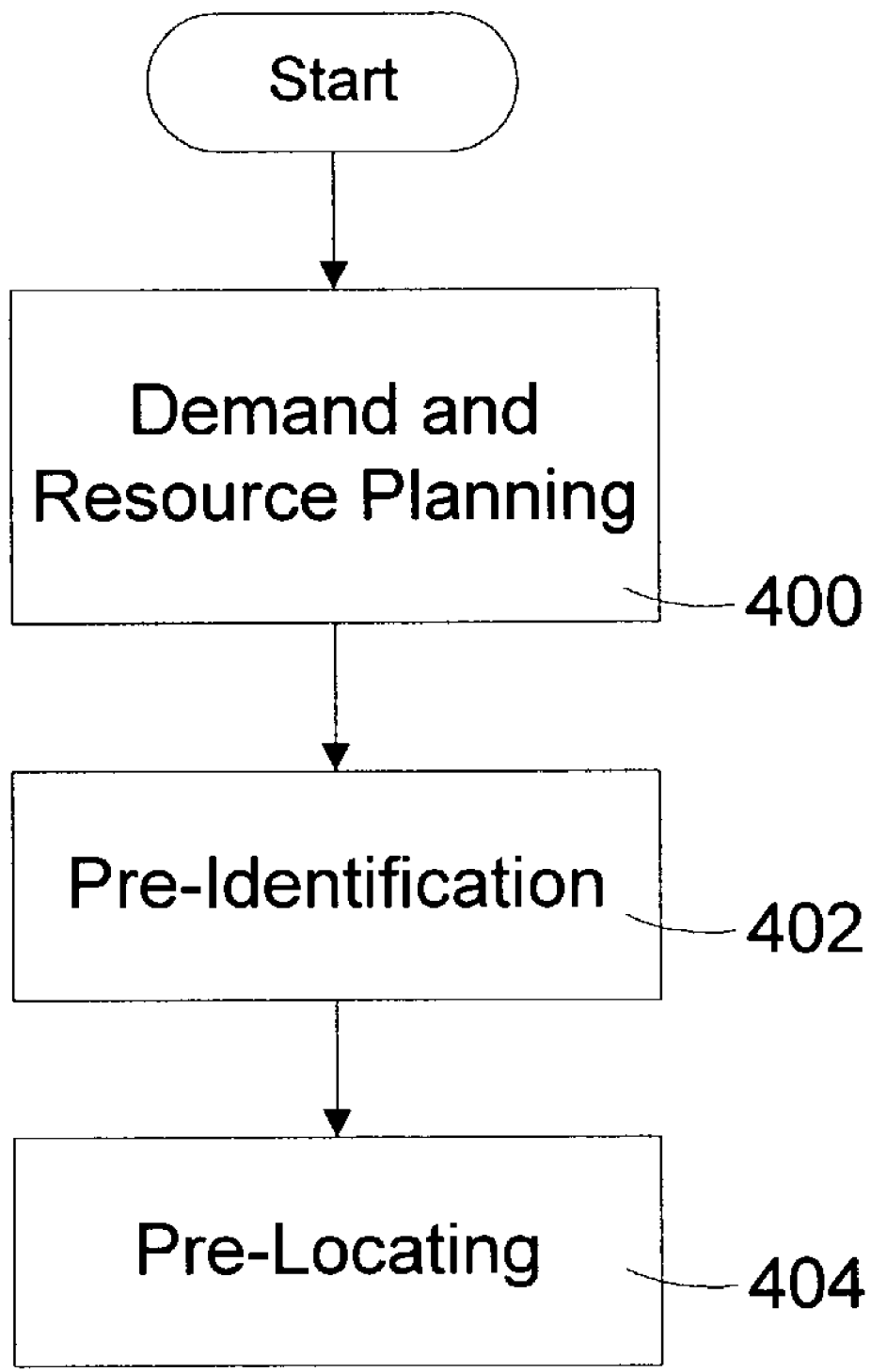
FIG. 5 illustrates a flow chart of a method of planning additional capacity in accordance with the present invention.

The triggering event to transition to the undeployed state 206 from the tested state 204 occurs when a need is anticipated for bringing on additional capacity within the programmable device or adding additional programmable devices to the function (e.g., data center). Turning now to FIG. 5, demand planning and resource planning are performed in the planning procedures 222 after the controller 24 initiates the transition (step 400). Demand planning is performed to quantify and project need based on customer demand (e.g., new customers and expansion of capacity for existing customers), replacement of machines (e.g., failures and retirements), maintenance of spare capacity, and predictive demand planning. Once demand planning is completed, resource planning is performed to determine a plan to fulfill the need projected by the demand planning. The resource planning includes planning physical resources (e.g., data centers, racks, slots, and the like), planning computer resources, planning networking and storage resources (e.g., routers, switches, storage devices and the like) and environmental planning (e.g., power and cooling requirements, space needs, etc.).

From the demand and resource planning, pre-identification (step 402), and pre-locating (step 404) are done. Pre-identification identifies the items required. For example, the programmable devices, machine names, etc. are identified. Pre-locating identifies the location, slot, network settings, etc. for the programmable device. Once the above set of procedures 222 is completed, the transition between the tested state 204 and undeployed state 206 is completed and the function 22 enters into the undeployed state 206. Where no planning is necessary (e.g., an image on a programmable device 22 is being upgraded), the programming device 22 is transitioned directly to the undeployed state 206.

Figure 6:
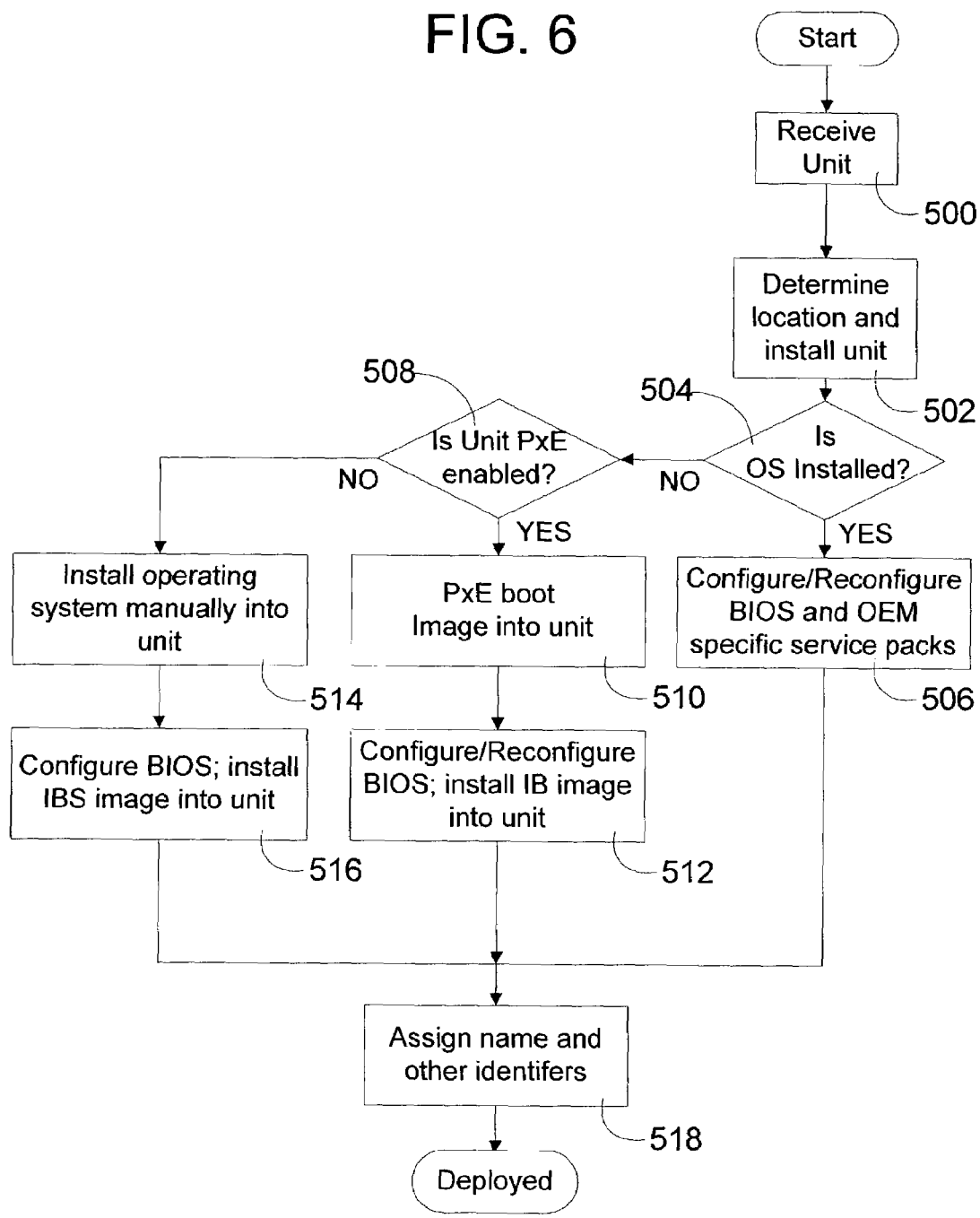
FIG. 6 illustrates a flow chart of a method of deploying a programmable device in accordance with the present invention.

When a programmable device 22 is ready for deployment, the controller 24 initiates the transition to the deployed state 208. Turning now to FIG. 6, the first step in the deployment procedures 224 is to receive the programmable device 22 at the installation site (step 500). The installed location of the programmable device 22 is determined and the programmable device 22 is installed (step 502). Once the programmable device 22 is installed in its physical location, an operator through a control script 30 or web/wireless interface 32 invokes the controller 24 to use a command script module 50 to transition the programmable device 22 to a deployed state. Alternatively, a policy or management application 28 automatically invokes the controller 24 to use a command script module 50 to transition the programmable device 22 to the deployed state.

The controller 24 detects whether an operating system is installed on the programmable device 22 (step 504). If an operating system is installed, the controller 24 uses command script modules 50 to add any OEM or customer specific service packs and if necessary, configure or reconfigure BIOS (step 506). If the programmable device 22 is capable of being PxE (Portable Executable Environment) booted (step 508), PxE is used to vector the programmable device 22 to the specific image (i.e., the image of the operating system to be used) to be loaded and load that image to the programmable device 22 (step 510). The command script modules 50 installs an initial boot image and, if necessary, add any OEM or customer specific service packs and configures or reconfigures BIOS (step 512). If the programmable device 22 is not capable of being PxE booted, the specific image to be loaded is manually installed on the programmable device 22 (step 514). The command script modules 50 then installs an initial boot image and, if necessary, add any OEM or customer specific service packs and configures or reconfigures BIOS (step 516). The initial boot image is an initial operating environment that includes an agent that enables the controller 24 to detect and communicate with the programmable device 22. The programmable device 22 is assigned a name and other identifiers. For example, an IP address is assigned to the programmable device 22 via an automated system such as DHCP or via additional command script modules 50, the programmable device 22 is assigned to a group, etc. Once the above set of procedures 224 is completed, the transition is completed and the programmable device 22 enters into the deployed state 204.

Figure 7:
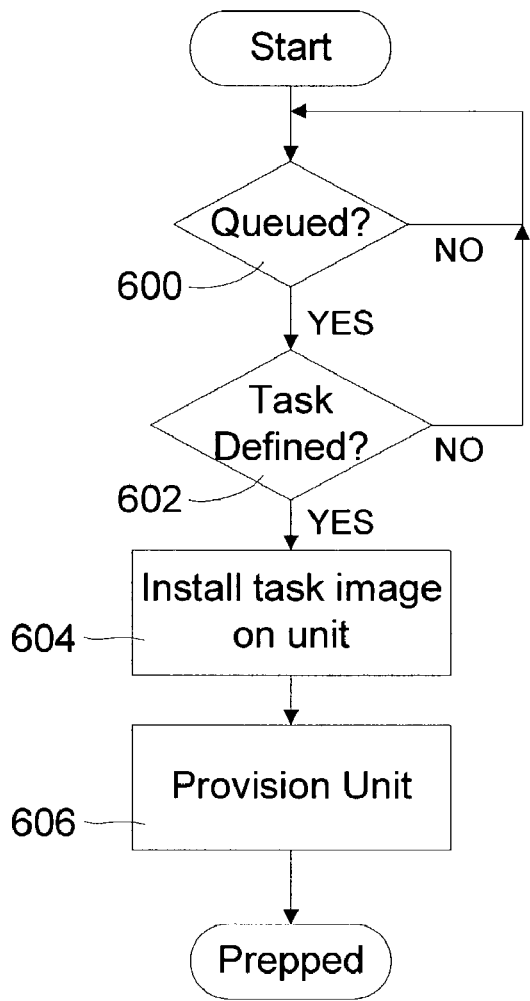
FIG. 7 illustrates a flow chart of a method of prepping a programmable device in accordance with the present invention.

Once the programmable device 22 has been deployed, the controller 24 may initiate a transition into the prepped state 210. This transition may happen immediately following the transition into the deployed state 208 or at some later point. Turning now to FIG. 7, The triggering event to transition to the prepped state 210 occurs when a "work queue entry" has been created and a task has been defined. The controller 24 checks to see if a "work queue entry" has been created (step 600) to verify the store 52 has been updated, and determines if the task for the programmable device 22 has been defined by the operator or policy (step 602). If either the task is not defined or the entry is not created, the state of the programmable device 22 is moved back into the deployed state 208. If the task is defined and the entry has been created, the task image associated with the task is copied from the image repository 50 to the programmable device 22 (step 604). The programmable device is provisioned to the point of being operational. At this point, a verified image has been installed on the programmable device 22 and the programmable device 22 enters the prepped state.

Figure 8:
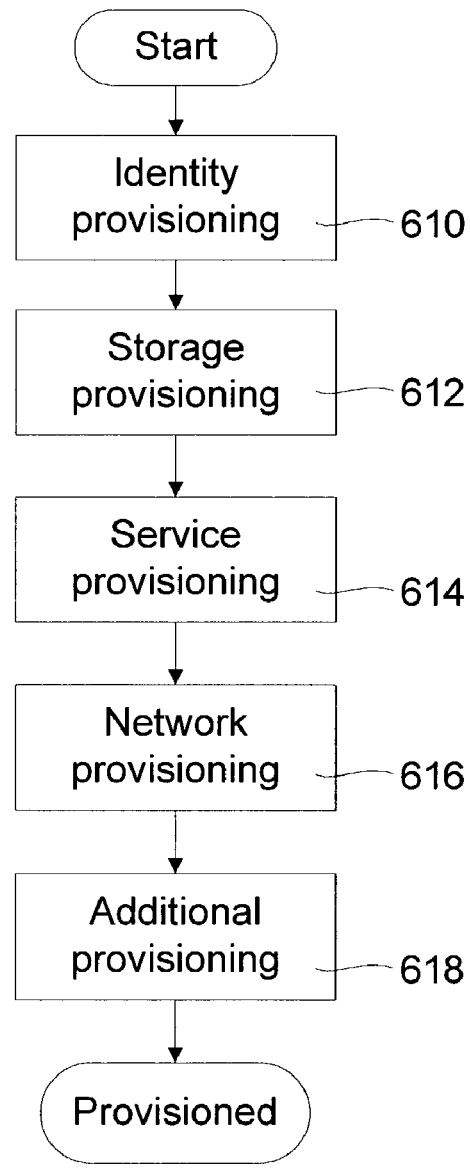
FIG. 8 illustrates a flow chart of a method of provisioning a programmable device in accordance with the present invention.

Once the programmable device 22 has been prepped, the controller 24 initiates a transition into the provisioned state 210 when the role of the programmable device has been determined. As used herein, the role is determined when the job of the programmable device is fully defined, including a defined task and fully defined provisioning settings. Turning now to FIG. 8, if the role has been defined, the programmable device 22 is provisioned. The provisioning procedure 228 includes identity provisioning (step 610), storage provisioning (step 612), service provisioning (step 614), network provisioning (step 616), and additional provisioning (step 618).

In identity provisioning, a command script 50 changes the communication address (e.g., IP address) and machine name of the programmable device to the ones that are assigned by the owner/customer. The command script 50 may also change other identifiers that identify the programmable device. The communication address, machine name, and other identifiers are stored in store 52. Additionally, if the programmable device 22 is placed into a group or domain, the command script 50 changes the group or domain to the ones that are assigned by the customer.

In storage provisioning, a command script 50 maps any local storage drives on the programmable device 22 and copies data onto the local storage drives from network drives. If the programmable device 22 is installed on a storage area network (SAN), the command script 50 uses the storage abstraction 44 to place the programmable device 22 on the SAN so that data can be received. If the programmable device 22 is a NAS appliance, a command script 50 is used to make sure that the programmable device 22 has the permissions needed to share where all the data for the site is housed.

In service provisioning, controller 24 adds communication configurations and applications are installed and configured on the programmable device 22. User security permissions (e.g., local administrator, power user, etc.) are added to the programmable device 22.

If the programmable device 22 is installed on a network, the controller 24, in network provisioning, communicates with the network switch and assigns the programmable device 22 to a particular LAN. Command scripts 50 drive changes to the network load balancing infrastructure so that the programmable device 22 and other devices will be load balanced.

Additional provisioning is added to the programmable device 22 if required. The additional provisioning could include installing additional applications, adding users, etc.

Once provisioning is completed, the function 22 enters the provisioned state 212. Command scripts 50 are run to bring the programmable device 22 on line. Once in the in-service state 214, the controller 24 performs monitoring, management, and maintenance tasks. The monitoring tasks includes software license tracking to ensure that the programmable device 22 is in compliance and service level agreement monitoring to ensure that the service level agreement is being met. If the service level agreement is not being met, the controller 24 determines what actions need to be taken to restore services.

The controller 24 may provide several levels of management including billing and accounting to power management. If the programmable device 22 is installed in a rack with other programmable devices, the rack is viewed as a single entity and power management is performed. Power and cooling loadings are frequently exceeded by new hardware designs. For example, in a typical data center constructed 5 years ago, a 42 unit rack of servers (i.e., programmable devices) would have a maximum power consumption of about 5,000 watts. A 42 unit rack fully packed with today's servers can easily exceed 10,000 watts. The present solution for this is not to fully populate the rack with servers such that it doesn't exceed the rated capacity. With the present invention, the rack of servers can now be fully populated, and managed within a single power and cooling envelope. Each programmable device 22 can be optimally power managed based on the load it is experiencing such that the 42 unit rack doesn't exceed a predetermined rating (e.g., 5,000 watts). It is highly unlikely that every server in rack needs to be run at full power at any given time. Therefore this kind of power load balancing is likely to have little or no impact on individual servers: they can be run with just enough power given their load, and, most of the time, statistics of averaging will keep the load under the rated maximum (5000 watts in this example). The controller 24 can also use command scripts 50 that also reduce the power envelope of each rack of servers during a "brownout" or power alert, with an algorithm implemented that shares the pain equally between customers. Alternatively, an algorithm can be used that provides more power for those customers paying a premium. Also, individual devices can be transitioned to lower power states in the middle of the night, when they are not being used.

The controller 24 also automates planned maintenance in the in-service state. The tasks performed in planned maintenance includes application of hot fixes, security patches, operating system and application upgrades, hardware upgrades, backup and restore functions, customer migration, administration and auditing of security, and self-service provisioning (i.e., installation and configuration of applications).

While in the in-service state 214, the controller 24 transitions the function to the trouble state 216 when unexpected disruptions of service provided by the function occur. These disruptions include viruses, slow response times (e.g., bottlenecks) due to hardware or software, and hard failures and intermittent failures due to hardware or software. In the trouble state 216, the controller 24 determines the causes of the unexpected disruptions and attempts to resolve the causes and bring the function 22 back on-line. When the function 22 is back on-line, the in-service state 214 is reentered.

Figure 9:
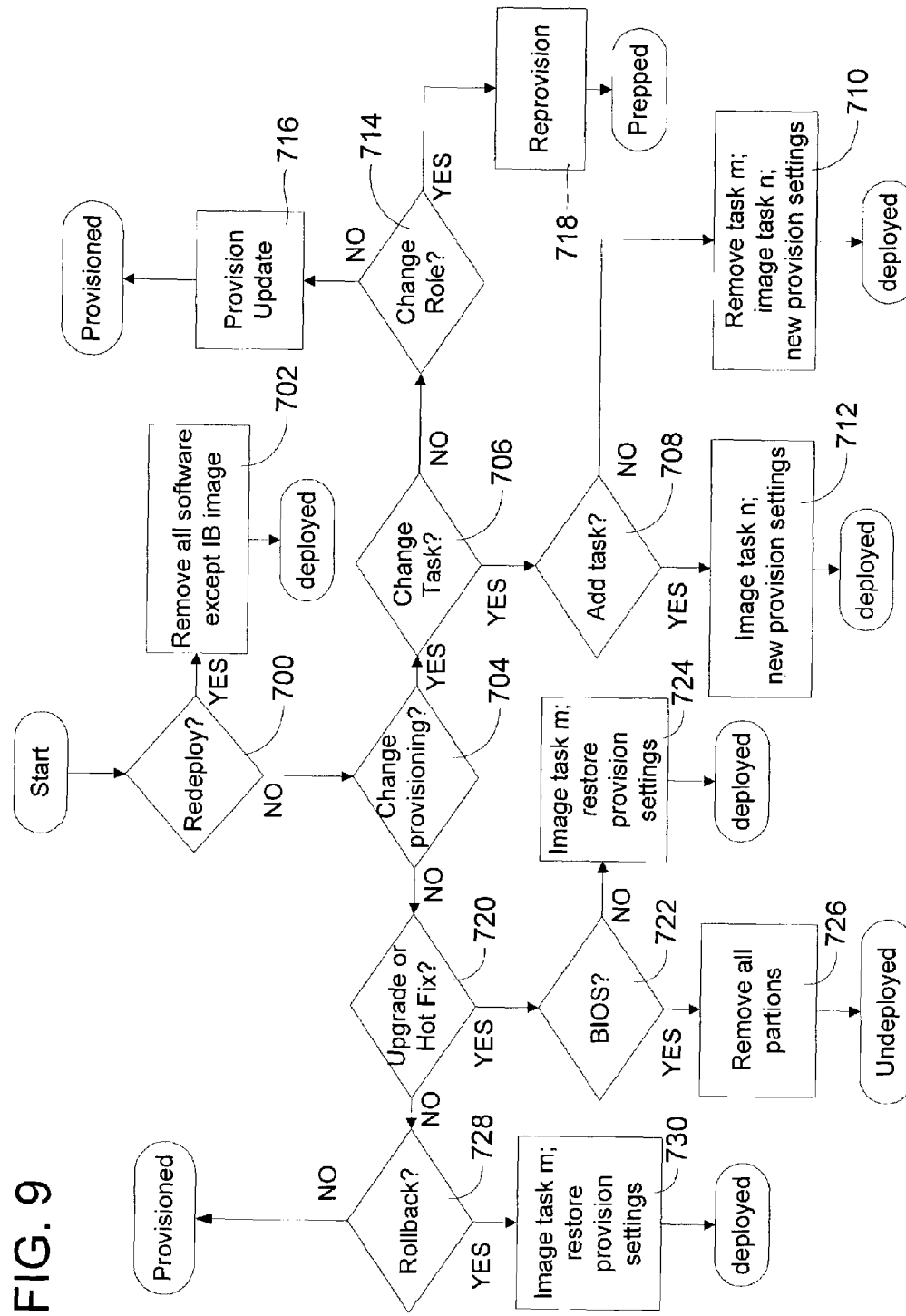
FIG. 9 illustrates a flow chart of a method of repurposing a programmable device in accordance with the present invention.

While in the in-service state 214, the controller may be directed to redeploy or reprovision the function 22. The function 22 is brought off line and moved into the provisioned state 212 when the controller 24 is directed to redeploy or reprovision the function. The triggering event to transition to the undeployed state 206 from the provisioned state 212 occurs when the function 22 is to be redeployed. Redeployment occurs when events such as the physical ownership of the function 22 changes or the location of the programmable device 22 changes. Turning now to FIG. 9, if redeployment is to occur (step 700), the process 230 the controller 24 initiates is to removes all software installed on the programmable device 22 except for the initial boot image (step 702) and redeploy the programmable device 22. This results in all data being erased from the programmable device 22 and the programmable device 22 is transitioned into the deployed state 208 using the deployment process 224.

There are several degrees of re-provisioning that the controller 24 directs. For example, re-provisioning occurs when load rebalancing occurs (e.g., load balancing between two separate web site locations) or peak load balancing occurs (e.g., a breaking news story increases traffic to a web site and moving web appliances into the news site domain to handle the increased traffic). The controller determines if re-provisioning is to be done (step 704). If provisioning is to be changed and the controller 24 is directed to change a task (step 706), the controller 24 checks to see if an additional task is being added (step 708). If the task is to be changed and the existing task is being deleted, the task image installed on the programmable device 22 is removed. A new task image is installed and the new provision settings for the programmable device 22 are stored in store 54 (step 710) and the controller transitions the programmable device to the deployed state 208. If the task is to be changed and a new task is being added, the new task image is installed and the new provision settings for the programmable device 22 are stored in store 54 (step 712) and the controller transitions the programmable device to the deployed state 208.

If the task is not being changed, the controller 24 determines if the role is being changed (step 714). If the role of the programmable device is not being changed, a provision update is performed. The programmable device 22 is transitioned to the prepped state 210 (process 232) and settings are changed using the provisioning process 228 (step 716) and the programmable device 22 is transitioned back to the provisioned state 212. If the role of the programmable device 714 is being changed, the reprep process 234 is performed on the programmable device 22 where the programmable device 22 is re-provisioned and the new provision settings are stored (step 718) and the controller transitions the programmable device to the prepped state 210.

If the provisioning is not being changed, the controller 24 determines if the programmable device 22 is being upgraded or hot fixed (step 720). If the programmable device 22 is being upgraded or hot fixed, the controller 24 determines if the BIOS, if installed on the programmable device, is to be upgraded (step 722). If the BIOS is not to be upgraded or is not one the programmable device 22, an upgrade image is installed on the programmable device 22, provision settings are restored, and the programmable device 22 is transitioned to the deployed state 208 (step 724). If the BIOS is to be upgraded, all partitions on the programmable device 22 are removed (step 726) and the programmable device 22 is transitioned to the undeployed state 206.

If the programmable device 22 is not being upgraded or hot fixed, the controller 24 determines if the programmable device 22 is being rollbacked to a previous state in case of trouble occurring after a fix or upgrade is installed on the programmable device 22 (step 728). If the programmable devices is being rollbacked, the image that was on the programmable device 22 prior to the upgrade/hot fix is copied from the image repository 52 onto the programmable device 22 and the provision settings from the image prior to the upgrade/hot fix are restored (step 730) and the programmable device is transitioned to the deployed state 208. If no rollback is being done, the programmable device 22 is moved back to the provisioned state 208.

The programmable device 22 is moved to the retirement state 216 when the programmable device is removed from service. The programmable device 22 is either recycled or destroyed.

As previously indicated, the typical states of a computer service (see FIG. 3b) include the untested state 202, the tested state 204, the planned state 250, the provisioned state 212, the on-line state 214, the trouble state 216, and the retired state 218. Many of the triggering events for a computer service are the same for a programmable device. The triggering event for the transition between the untested state 202 and the tested state 204 occurs when a new service is being developed and tested. The testing and development process 220 for the service includes building any programmable devices and other hardware/software needed for the service and performance testing the programmable devices and hardware/software.

The transition from the tested state 204 to the planned state 250 or the transition from the on-line state 214 to the planned state 250 is triggered when a need is anticipated for bringing on additional capacity within the programmable device or adding additional programmable devices to the service. The tasks to be performed in the planning process 222 include determining if a new service will be added to an existing service, determining the number of users, and determining the number of programmable devices needed to support the service. Once the tasks are performed, the service is moved into the planned state 250.

The controller 24 may initiate a transition from the planned state 250 to the provisioned state 212 immediately following the transition into the planned state 208 or at some later point. The tasks performed in the provision devices process 252 includes ordering the programmable devices and other hardware/software needed to implement the service and bringing each of the programmable devices through their lifecycle states until each programmable device is transitioned to the provisioned state 212 (reference FIG. 3a and FIGS. 4–8).

Once the programmable devices are provisioned, the controller 24 initiates the transition of the programmable devices to the in-service state 214 and brings the service to the on-line state 214.

While in the on-line state 214, the controller 24 transitions the service 22 to the trouble state 216 when unexpected disruptions of service occur. These disruptions include viruses, slow response times (e.g., bottlenecks) due to hardware or software, and hard failures and intermittent failures due to hardware or software. In the trouble state 216, the controller 24 determines the causes of the unexpected disruptions and attempts to resolve the causes and transition the service 22 back on-line. When the service 22 is back on-line, the on-line state 214 is reentered.

The service 22 is transitioned to the retired state 216 when the service is no longer needed. Programmable devices used in the service are either retired, redeployed, re-prepped, or reprovisioned in accordance with the procedures described above.

It is recognized that each programmable device has its own lifecycle and each service has its own lifecycle. For example, if the service is a web site, the web site has a lifecycle that users experience while the servers used to implement the web site have lifecycles. A dependency between a service lifecycle and a programmable device lifecycle exists. For example, a service having customer accounts could use multiple programmable devices and load-balance between the devices or use one programmable device. If a particular programmable device in the service using multiple programmable devices experiences trouble, that particular programmable device is transitioned to the trouble state 216 while the service continues to be in the on-line state 214. Conversely, if the service is only using one programmable device and the programmable device experiences trouble, the programmable device and the service are both transitioned into the trouble state 216. Once the programmable device is transitioned back to the in-service state 214, the service may be brought back to the on-line state 214.

A method and system to automate the deployment, provisioning, and management of a function (e.g., programmable device or computer service) for the life cycle of the function has been presented. The system dynamically moves a programmable device or computer service from one state of its lifecycle to another state when triggering events occur. The extensible infrastructure and mechanism significantly reduces both the amount of labor and the level of skill required for direct technical support (e.g. deploying and provisioning hardware and software) for hosting and other software applications. The system results in an increased efficiency of programmable devices, which could reduce the number of programmable devices required for a particular function. Indirect technical support staff that develop and support proprietary provisioning software is reduced with the present invention, allowing clients to focus on their core businesses. The responsiveness of an xSP is increased by being able to respond quickly (minutes if not seconds) to new or existing customer requests for additional web services. The system and method provides a common, industry-wide platform for OEMs and other developers to independently create value added products and enables the most efficient use of hardware and resources to tackle computing loads and demands. This results in reducing the amount of labor and the level of skill required to support programmable devices.

In view of the many possible embodiments to which the principles of this invention may be applied, it should be recognized that the embodiment described herein with respect to the drawing figures is meant to be illustrative only and should not be taken as limiting the scope of invention. For example, those of skill in the art will recognize that the elements of the illustrated embodiment shown in software may be implemented in hardware and vice versa or that the illustrated embodiment can be modified in arrangement and detail without departing from the spirit of the invention. Therefore, the invention as described herein contemplates all such embodiments as may come within the scope of the following claims and equivalents thereof.

We claim:

1. A computer implemented method for automated management of the lifecycle of at least one server, the method comprising:
   providing a plurality of predefined management states of the lifecycle, including an initial management state of the lifecycle and a final management state of the lifecycle, where the management lifecycle comprises a lifecycle of managing the server;
   providing a plurality of sets of automated procedures for transitioning the server from one state of the lifecycle to another state of the lifecycle; and
   initiating a transition from the one state of the lifecycle to the other state of the lifecycle in response to a triggering event, where the transition is carried out by the set of automated procedures that modify the server.

2. The method of claim 1 further comprising transitioning the server from the one state of the lifecycle to the other state of the lifecycle.

3. The method of claim 1 wherein the one state of the lifecycle comprises an untested state and the other state of the lifecycle comprise a tested state and wherein the step of initiating a transition from the one state of the lifecycle to the other state of the lifecycle is triggered when the at least one server is being developed and tested.

4. The method of claim 3 wherein one of the plurality of sets of automated procedures comprises a test and development procedure, the method further comprising transitioning the server from the untested state to the tested state in accordance with the test and development procedure.

5. The method of claim 4 wherein the test and development procedure comprises:
   creating one of a new image and an upgraded image on a reference system; transferring the one of the new image and the upgraded image to an image repository;
   verifying the one of the new image and the upgraded image in the image repository meets predetermined requirements; and
   installing the one of the new image and the upgraded image on a programmable device associated with the server.

6. The method of claim 1 wherein the one state of the lifecycle comprises a tested state and the other state of the lifecycle comprise an undeployed state and wherein the step of initiating a transition from the one state of the lifecycle to the other state of the lifecycle is triggered when a need is anticipated for one of adding additional capacity to a programmable device and adding at least one additional programmable device to the server.

7. The method of claim 6 wherein one of the plurality of sets of automated procedures comprises a planning procedure, the method further comprising transitioning the server from the tested state to the undeployed state in accordance with the planning procedure.

8. The method of claim 7 wherein the planning procedure comprises:
   performing a demand planning to quantify an additional need; and
   performing a resource planning to fulfill the additional need.

9. The method of claim 8 wherein the step of performing the resource planning includes the steps of:
   planning physical resources;
   planning compute resources;
   planning environment requirements; and
   planning networking and storage resources.

10. The method of claim 6 comprising transitioning the server from the tested state to the undeployed state.

11. The method of claim 1 wherein the one state of the lifecycle comprises an undeployed state and the other state of the lifecycle comprise a deployed state and wherein the step of initiating a transition from the one state of the lifecycle to the other state of the lifecycle is triggered when a programmable device is ready for deployment.

12. The method of claim 11 wherein one of the plurality of sets of automated procedures comprises a deployment procedure, the method further comprising transitioning the server from the undeployed state to the deployed state in accordance with the deployment procedure.

13. The method of claim 12 wherein the deployment procedure comprises:
   installing an initial boot image on a programmable device received at an installation location;
   setting communication settings on the programmable device; and
   setting an initial identification parameter on the programmable device.

14. The method of claim 1 wherein the one state of the lifecycle comprises a deployed state and the other state of the lifecycle comprise a prepped state and wherein the step of initiating a transition from the one state of the lifecycle to the other state of the lifecycle is triggered after a task for a programmable device has been defined.

15. The method of claim 14 wherein one of the plurality of sets of automated procedures comprises a prepping procedure, the method further comprising transitioning the server from the deployed state to the prepped state in accordance with the prepping procedure.

16. The method of claim 15 wherein the prepping procedure comprises transferring a task image to the programmable device.

17. The method of claim 1 wherein the one state of the lifecycle comprises a prepped state and the other state of the lifecycle comprise a provisioned state and wherein the step of initiating a transition from the one state of the lifecycle to the other state of the lifecycle is triggered after a role for a programmable device has been determined.

18. The method of claim 17 wherein one of the plurality of sets of automated procedures comprises a provisioning procedure, the method further comprising transitioning the server from the prepped state to the provisioned state in accordance with the provisioning procedure.

19. The method of claim 18 wherein the provisioning procedure comprises:
performing an identity provisioning on the programmable device;
performing a service provisioning on the programmable device;
performing a storage provisioning; and
performing additional provisioning.

20. The method of claim 1 wherein the one state of the lifecycle comprises a provisioned state and the other state of the lifecycle comprise an in-service state and wherein the step of initiating a transition from the provisioned state to the in-service state is triggered after a programmable device has been provisioned.

21. The method of claim 20 further comprising transitioning the server from the provisioned state to the in-service state.

22. The method of claim 1 wherein the one state of the lifecycle comprises an in-service state and the other state of the lifecycle comprise a trouble state and wherein the step of initiating a transition from the one state of the lifecycle to the other state of the lifecycle is triggered after a disruption of service provided by the server occurs.

23. The method of claim 22 wherein the disruption of service includes one of a virus, a slow response time, and a failure of a component.

24. The method of claim 1 wherein the step of providing a plurality of predefined states of the lifecycle includes providing an in-service state, a provisioned state, and a deployed state.

25. The method of claim 24 wherein the step of providing a plurality of predefined states of the lifecycle further includes providing a trouble state, an undeployed state, a tested state, an untested state and a prepped state.

26. The method of claim 1 wherein the one state of the lifecycle comprises a provisioned state and the other state of the lifecycle comprise an undeployed state and wherein the step of initiating a transition from the one state of the lifecycle to the other state of the lifecycle is triggered after a request is received to redeploy a programmable device, the method further comprising removing all software installed on the programmable device and either reinstalling an initial boot image or leaving the initial boot image on the programmable device.

27. The method of claim 1 wherein the one state of the lifecycle comprises one of a tested state and an on-line state and the other state of the lifecycle comprise a planned state and wherein the step of initiating a transition from the one state of the lifecycle to the other state of the lifecycle is triggered after a need is anticipated to add additional capacity to the server.

28. The method of claim 27 wherein one of the plurality of sets of automated procedures includes a planning procedure, the method further comprising the step of transitioning to the planned state in accordance with the planning procedure, the planning procedure comprising:
performing a demand planning to quantify the additional need; and
performing a resource planning to fulfill the additional need.

29. The method of claim 28 wherein the step of performing the resource planning includes the steps of:
planning physical resources;
planning compute resources;
planning environment requirements; and
planning networking and storage resources.

30. The method of claim 1 further comprising the step of managing power consumption of the at least one server.

31. The method of claim 30 wherein the at least one server comprises at least one programmable device having a load requiring a power amount, the step of managing power consumption of the at least one server comprises the steps of:
providing the at least one programmable device with an amount of power to provide the load the power amount; and
reducing the amount of power during a power alert condition.

32. The method of claim 31 wherein the step of reducing the amount of power during a power alert condition comprises the step of reducing the amount of power to each of the at least one programmable device by an equal amount of power.

33. The method of claim 31 wherein the step of reducing the amount of power during a power alert condition comprises the step of reducing the amount of power by a percentage that is proportional to a premium paid by each of the at least one programmable device.

34. The method of claim 31 wherein the amount of power is decreased to a lower amount of power when the at least one programmable device is not being used.

35. A computer readable storage medium storing computer-executable instructions for performing the steps of claim 1.

36. The computer-readable storage of claim 35 wherein the server has at least one programmable device, the initial state of the lifecycle comprises a deployed state and the final state of the lifecycle comprises a retired state, the plurality of predefined states includes a provisioned state and an in-service state, the computer-readable medium having further computer-executable instructions for performing the steps comprising:
initiating a transition from the deployed state to the prepped state after a task for the at least one programmable device has been defined;
initiating a transition from the prepped state to the provisioned state after a role for the at least one programmable device has been defined;
initiating a transition from the provisioned state to the in-service state after the at least one programmable device is put in-service; and
initiating a transition from the in-service state to the retired state after the at least one programmable device is removed from service.

37. A computer readable storage storing information for enabling a computer to perform a process, the process comprising executing a state engine for managing a plurality of states of at least one programmable device, the plurality of states including an untested state, a tested state, an undeployed state, a deployed state, a prepped state, a provisioned state, an in-service state, a retired state, and a trouble state, where the managing comprises transitioning a current state of the programmable device to and from the states in the plurality of states.

38. A system for managing at least one function comprising:

an automation interface for a developer to develop modules to aid in the automation of the management of the at least one function, the automation interface including at least one port for communication with a policy application and a management application;

a software engine in communication with the automation interface for initiating a transition from one life cycle state to another life cycle state; and a set of control scripts in communication with the software engine.

39. The system of claim 38 further comprising an image repository for storing images, the image repository in communication with the software engine.

40. The system of claim 39 wherein the plurality of interfaces includes:

a deployment interface for deploying specific hardware; and an imaging interface for creating an image to be installed on the at least one programmable device.

41. The system of claim 40 wherein the plurality of interfaces further includes:

a web appliance interface for communicating with a web appliance.

42. The system of claim 38 further comprising a plurality of interfaces in communication with the automation interface and the software engine, the plurality of interfaces allowing the developer to plug in a module to control a hardware device.

43. The system of claim 42 wherein the plurality of interfaces includes at least one abstraction interface for hardware involved in deploying and provisioning of the at least one programmable device.

44. The system of claim 43 wherein the at least one abstraction interface includes a network abstraction.

45. The system of claim 43 wherein the at least one abstraction interface includes a storage area network abstraction.

46. The system of claim 38 further comprising a store for maintaining information necessary to configure the at least one programmable device.

47. A computer readable medium for managing at least one function through a lifecycle, the computer readable medium having computer executable instructions for the steps comprising:

providing a plurality of predefined states of the lifecycle, including a deployed state, a prepped state, a provisioned state, and an in-service state;

providing a plurality of procedures for transitioning the at least one function from one state of the lifecycle to another state of the lifecycle;

initiating a transition from the deployed state to the prepped state after a task for the at least one function has been defined;

initiating a transition from the prepped state to the provisioned state after a role for the at least function has been defined; and initiating a transition from the provisioned state to the in-service state after the at least one function is put in-service.

48. The computer-readable medium of claim 47 having further computer-executable instructions for performing the step comprising initiating a transition from the in-service state to the retired state after the at least one function is removed from service.

49. A computer readable medium for managing at least one service through a lifecycle, the at least one service having at least one programmable device, the computer readable medium having computer executable instructions for the steps comprising:

providing a plurality of predefined states of the lifecycle, including a planned state, a provisioned state, and an on-line state;

providing at least one set of procedures for transitioning the at least one service from one state of the lifecycle to another state of the lifecycle;

initiating a first state transition, the first state transition comprising a transition of the at least one service from the planned state to the provisioned state after a planning process has been run; and initiating a second state transition, the second state transition comprising a transition of the at least one service from the provisioned state to the on-line state after the at least one programmable device has been provisioned with information that configures the at least one programmable device.

50. The computer readable medium of claim 49 wherein the at least one programmable device has a plurality of predefined device states of a device lifecycle, including a device undeployed state and a device provisioned state, the at least one set of procedures includes a provisioning procedure for transitioning the at least one service to the provisioned state, the computer readable medium having further computer executable instructions for performing the provisioning procedure, the provisioning procedure comprising:

initiating a third state transition, the third state transition comprising a transition of the at least one programmable device from the device undeployed state to the device provisioned state; and transitioning the at least one programmable device from the undeployed state to the provisioned state.

* * * * *